(12) United States Patent
Kawanami et al.

(10) Patent No.: US 6,362,816 B1
(45) Date of Patent: Mar. 26, 2002

(54) DISPLAY CONTROL METHOD AND DISPLAY CONTROL APPARATUS

(75) Inventors: Kenichiro Kawanami; Naoki Fujisawa, both of Kanagawa; Katsuhiro Shimizu, Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/309,667

(22) Filed: May 11, 1999

(30) Foreign Application Priority Data

May 13, 1998 (JP) .......................................... 10-130501

(51) Int. Cl.$^7$ ................................................. G09G 5/00
(52) U.S. Cl. ....................... 345/214; 345/638; 348/177; 348/588; 348/601
(58) Field of Search ................................ 348/177, 178, 348/179, 565, 578, 576, 588, 589, 600, 601, 625, 476, 552; 345/632, 630, 635, 638, 719–723, 204, 214, 30, 2, 423, 42

(56) References Cited

U.S. PATENT DOCUMENTS

| | | | |
|---|---|---|---|
| 5,107,443 A | | 4/1992 | Smith et al. |
| 5,208,903 A | | 5/1993 | Curry |
| 5,483,468 A | * | 1/1996 | Chen ........................... 345/418 |
| 5,513,306 A | * | 4/1996 | Mills ........................... 395/418 |
| 5,576,847 A | | 11/1996 | Sekine et al. |
| 5,613,019 A | * | 3/1997 | Altman ......................... 382/311 |
| 5,778,404 A | * | 7/1998 | Capps .......................... 707/531 |
| 5,822,002 A | * | 10/1998 | Tokoro ......................... 348/601 |
| 5,982,350 A | * | 11/1999 | Hekmatpour ................... 348/586 |

FOREIGN PATENT DOCUMENTS

| | | | | |
|---|---|---|---|---|
| EP | 0732842 | | 9/1996 | |
| EP | 841812 A2 | * | 5/1998 | .......... H04N/5/272 |
| JP | 411298795 | * | 10/1999 | .......... H04N/5/262 |
| JP | 411312072 | * | 11/1999 | .......... G06F/3/153 |
| WO | 9403897 | | 2/1994 | |
| WO | 9427229 | | 11/1994 | |

\* cited by examiner

*Primary Examiner*—Matthew Luu
*Assistant Examiner*—Wesner Sajous
(74) *Attorney, Agent, or Firm*—Jay H. Maioli

(57) ABSTRACT

In setting a plurality of types of image quality in a single screen, an arrangement is made to facilitate the setting of a range in which each image quality is set.

Upon generating a video signal to displayed on a predetermined display unit, the process is performed for inserting predetermined marker signals in the video signal at positions corresponding to at least two corners on the diagonal in a predetermined range of an image to be displayed. At the same time, the positions where the marker signals are inserted are moved in accordance with a predetermined operation input thereby to move the range set in the image to be displayed.

14 Claims, 17 Drawing Sheets

DISPLAY CONTROL METHOD AND DISPLAY CONTROL APPARATUS

BACKGROUND OF THE INVENTION

1. Field of the Invention

The present invention relates to a display control method for controlling the display of an image on a display unit for a computer equipment, for example, and a display control apparatus to which the control method is applied, or more in particular to a technique suitable to the case in which a static image, moving image and so on are displayed simultaneously with text information or otherwise images of different forms are displayed simultaneously on a single screen.

2. Description of the Related Art

In recent years, with the progress of the computer equipment and the like, a display unit connected to the computer has come to display a static image such as a photo or the like and a moving images such as a movie or the like. With the development of the internet or the like, on the other hand, a television receiver has come to display information such as characters or the like.

The static images such as a photograph or the like and a moving images such as a movie or the like have a great amount of information. On the television broadcasting represented by the NTSC broadcasting, therefore, a beautiful image cannot be transmitted. For this reason, the television receiver supplies a beautiful (improved) image to the users by improving the sharpness, the contract, etc. of the static images such as photos or the like and the moving images such as movies or the like.

This effect however has the advantages that the static images such as photos and the moving images such as movies are clearly and beautifully visible. Nevertheless, such portions as characters of text information and the like become harder to read, and if the brightness of character portions is too high, it leads to the adverse effects that the eyes are easily tired and cannot stand the long-time close watching.

The recent trend toward the incorporation and extension of the use of devices such as CD-ROM and DVD which handle a large capacity of data in the computer equipment has given rise to frequent chances of handling static images such as photos and moving images such as movies.

To meet this situation, in computer display units, an effort has been made to improve the quality of static images such as photos and moving images such as movies by improving the variable range of contrast (brightness). Also, some display units are known which have been further improved by incorporating the sharpness function.

In these display units, the image quality improvement function can be turned on/off (activated/deactivated), or the function level can be adjusted by the user. These functions, however, can be performed only over the entire screen or in a specified area that is preset on the screen.

In the monitor display unit for the computer equipment, for example, assume that an attempt is made to display what is called the image information including static images or moving images in a part of the area in the screen where text information such as characters and numerals or the like are displayed. If the process is performed for improving the image quality in conformance with the image on display, the problem is that the display condition of the text information is deteriorated. It has been difficult for the user to adjust both the image quality and the text quality to a correct state in a simplistic fashion.

In view of this, the present applicant has earlier proposed a display unit in which a plurality of classes of image quality can be set in a single screen (JP-A-10-88958, etc.). Even with this display unit, however, the user cannot easily set the range in which image quality is set such as the range in which each of the images and characters is displayed.

SUMMARY OF THE INVENTION

An object of the present invention is to make it possible to easily set the ranges of the respective image qualities, in the case where a plurality of classes of image quality are set in a single screen.

According to an aspect of the present invention, there is provided a display control method for effecting a predetermined image processing on a video signal to display an image in a display unit, which comprises:

a step for inserting predetermined marker signals into video signals at positions corresponding to at least two corners on a diagonal in a rectangular predetermined range of an image to be displayed;

a step for effecting different processing on video signals outside and inside of said predetermined range; and a step for moving positions where the marker signals are inserted based on to a predetermined operation input thereby to move the predetermined range in the image to be displayed.

By supplying the display unit with the video signal generated by this display control method, it is possible for the display unit to perform an image processing on the images located in the range designated by the marker signals which is different from the processing for the images in other ranges. In this way, the display control of images in a specific range is made possible, while at the same time making it possible to move the specific range for which the display is controlled, by moving the positions where the marker signals are inserted based on a predetermined operation input.

According to another aspect of the present invention, there is provided a display control apparatus for effecting a predetermined image processing on a video signal to display an image in a display unit, which comprises:

a video processing unit for generating a predetermined video signal;

a marker signal insertion processing unit for inserting predetermined marker signals in the video signal at positions corresponding to at least two corners on the diagonals in a predetermined range in one image; and a control unit for moving, based on a predetermined input, the positions where the marker signals are inserted by the marker signals insertion processing unit.

With this display control apparatus, when a predetermined input is applied to it, the positions where the marker signals are inserted can be moved under the control of the control unit and a video signal can be generated capable of display control of the image in an arbitrary range set by the input operation.

DESCRIPTION OF THE PREFERRED EMBODIMENTS

A first embodiment of the present invention will be explained below with reference to FIGS. 1 to 8.

This embodiment is applied to the display control processing of a display unit constituting display means of a computer equipment making up an information processing equipment called a personal computer apparatus. Specifically, a computer apparatus to which this embodiment is applied, as shown in an example configuration of FIG. 2, comprises a computer proper 200 to which a display unit 210, a keyboard 204, a mouse 205, etc. are connected.

Figure 1:
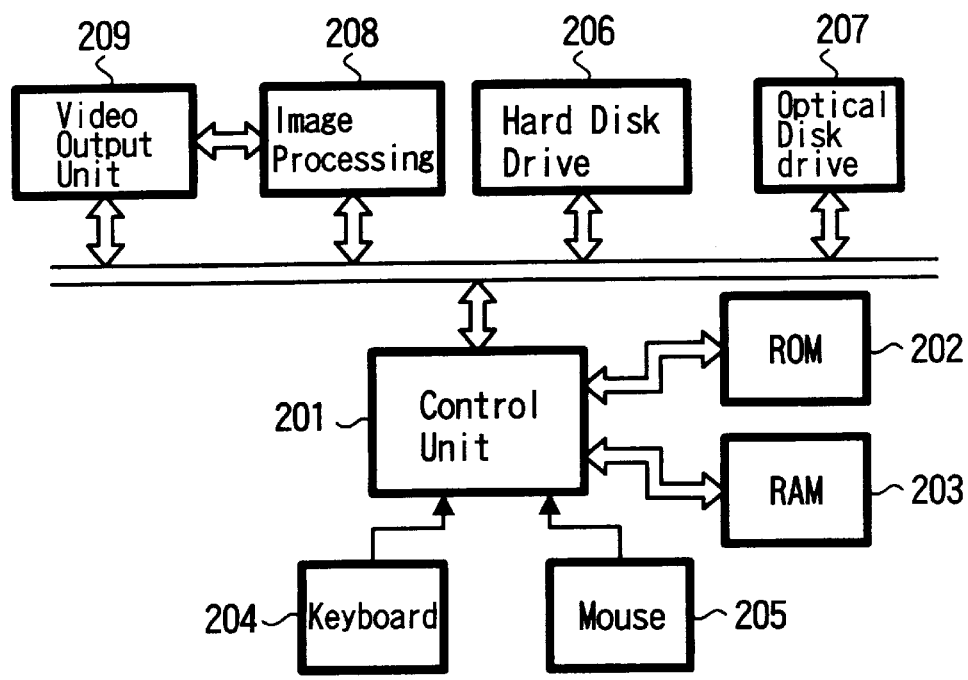
FIG. 1 is a block diagram showing an configuration example of a computer apparatus according to a first embodiment of the present invention.
Figure 2:
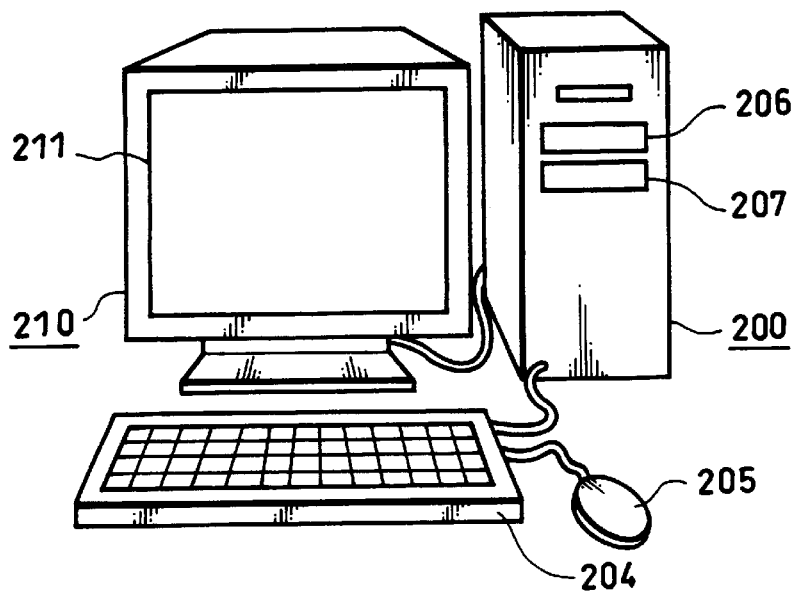
FIG. 2 is a perspective view showing a system configuration example of the computer apparatus according to the first embodiment of the present invention.

FIG. 1 is a diagram showing an example of the arrangement of the computer proper 200. A control unit 201 making up arithmetic processing means is connected with a ROM 202 and a RAM 203 required for executing the arithmetic operation, and the information on the operation by the keyboard 204 and the mouse 205 constituting operation input means are supplied to the control unit 201. Also, the computer proper 200 includes a hard disk drive unit 206 and an optical disk drive unit 207 constituting data write/read means. The process for storing in or reading from the drive unit 206 is executed under the control of the control unit 201.

Also, an image processing unit 208 is provided for processing an image to be displayed on the display unit 210. The image processing is executed based on a command supplied from the control unit 201 to the image processing unit 208 through a predetermined bus line. The image processing operation in the image processing unit 208 includes the process of supplying data such as a character string or the like generated by the arithmetic operation in the control unit 201 to the image processing unit 208 through the bus line and generating an image for displaying the particular data, and the process for supplying the data (image data and text data such as static images and moving images or the like) read from the hard disk drive unit 206 or the optical disk drive unit 207 to the image processing unit 208 through the bus line and generating video data for displaying images based on the data thus read. In this configuration, it is possible to generate video data by which the image due to the image data read from the storage medium in the drive units 206, 207, for example, and the images due to the text data generated in the control unit 201 are displayed on the same screen.

The video data generated in the image processing unit 208 are supplied to a video output unit 209 and converted into a video signal to be supplied to the display unit 210 for display. The video signal thus converted is supplied to the display unit 210. The conversion processing in the video output unit 209 of this embodiment includes, for example, the process for converting into a video signal of the three primary color signals including the red signal R, the green signal G and the blue signal B. Also, this video output unit 209 performs the process for inserting a marker signal in the video signal under the control of the control unit 201. The marker signal is a signal for controlling the image display condition when an image is displayed on the side of the display unit 210. For example, they are signals generated by combining the primary color signals of a predetermined level in a predetermined pattern using a predetermined section of one horizontal line. In this embodiment, as the marker signal insertion process, when an image processing window frame is set for displaying static images or moving images, the control unit 201 controls the positions of insertion in such a manner that the marker signal is inserted in the four corners of the image processing window frame.

Figure 3:
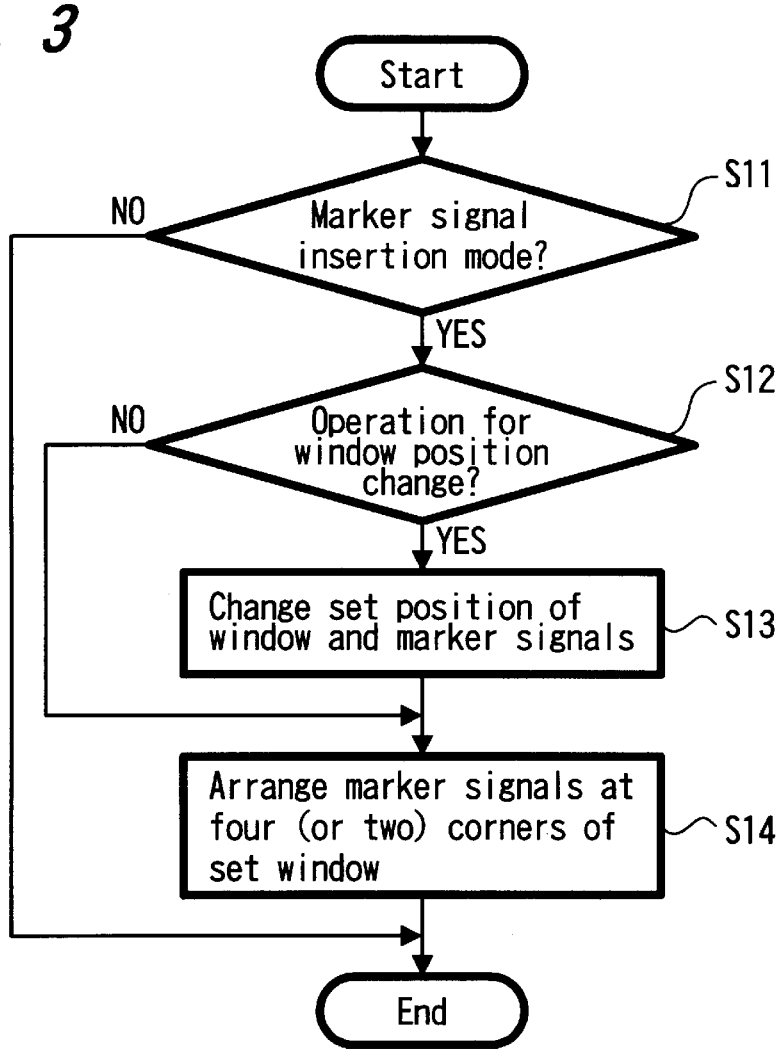
FIG. 3 is a flowchart showing an example of display control processing according to the first embodiment of the present invention.

The flowchart of FIG. 3 shows the display control process performed by the control unit 201. The control unit 201 judges whether the mode for inserting the marker signals is set by the user operation or the like or not (step S11), and in the case where the mode is set for inserting the marker signals, judges whether or not the operation has been performed for changing the position of the position of the image processing window frame (step S12) In the case where the operation is performed for changing the position of the image processing window frame, the position of the image processing window frame is changed, while at the same time changing the positions of the marker signals at the four corners of the window frame (step S13) in an interlocking fashion therewith. The position change in step S13 is performed by inputting a command to the control unit 201 for moving the cursor position based on the operation of the mouse 205 (or the operation of the keyboard 204), for example. Specifically, when the mode prevails for changing the position of the image processing window frame, the cursor position is moved by the mouse 205 or the like, whereby the position of the image processing window frame and the positions of the marker signals are moved in operatively interlocked relation with each other.

In the case where the control unit 201 judges that no operation has been performed for change in step S12, the control operation is performed for arranging the marker signals at the four corners of the window frame at previously set position. In the case where the positions of the window frame and the marker signals are changed in step S13, the control operation is performed for arranging the marker signals at the four corners of the window frame the position of which has been changed (step S14).

Figure 4:
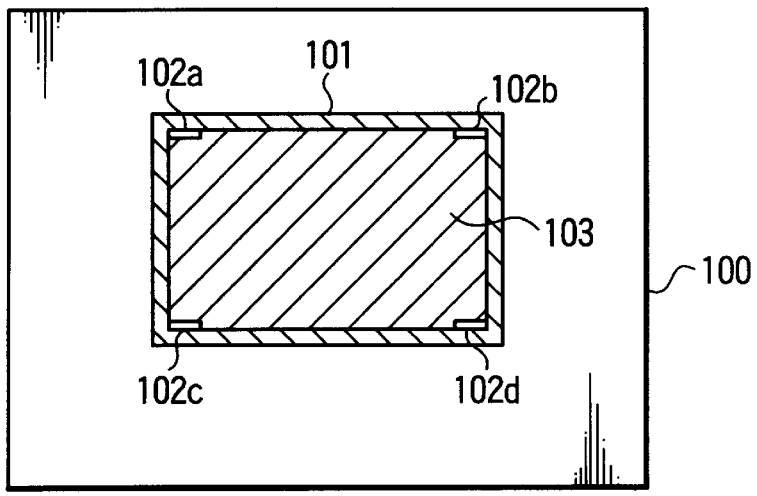
FIG. 4 is a diagram for explaining an example of display condition according to the first embodiment of the present invention.

Assume, for example, that the video signal processed in the video output unit 209 is supplied to the display unit 210 and a screen 100 displayed on a display section 211 of the display unit 210 is in the state shown in FIG. 4. An image processing window frame 101 is set at a predetermined position in the screen 100, and marker signals 102a, 102b, 102c, 102d are arranged on horizontal lines of the video signal at the positions corresponding to the four corners of the image processing window frame 101. The arranging position of the image processing window frame 101 is the position set by operating the mouse 205 or the keyboard 204.

Figure 5:
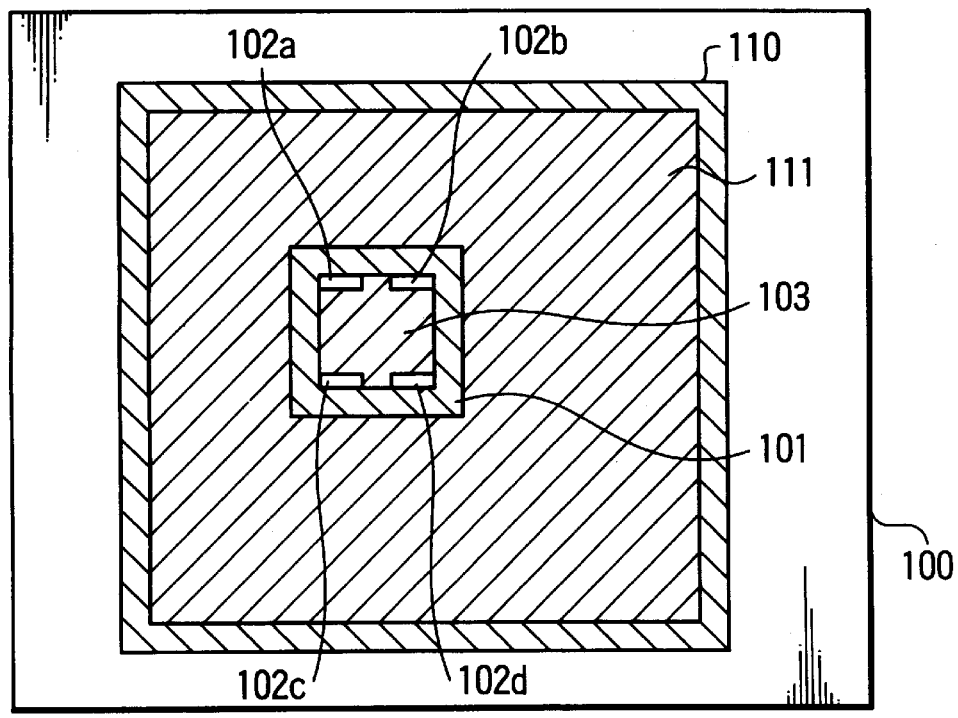
FIG. 5 is a diagram for explaining an example of display condition (an example with an image processing window frame overlapped with another window) according to the first embodiment of the present invention.

In FIG. 5, a predetermined window frame 110 (which is not necessarily an image display window) is arranged in the screen 100 displayed on the display section 211 of the display unit 210. An image processing window frame 101 in which the marker signals according to this embodiment are arranged is set at an arbitrary position in a range 111 for displaying an image or the like contained in the window frame 110. The marker signals 102a to 102d are arranged at the four corners of the inner sides of the image processing window frame 101. In this way, only a partial range 103 within the range 111 (the range 103 in the image processing window frame 101) can be designated by the marker signals. In this case, assume that the window frame 110, for example, is a window frame set by another software than that for the image processing window frame 101 in which the marker signals according to this embodiment are set. By setting the software in the computer apparatus 200 for generating the image processing window frame 101, the image in an arbitrary range on the window frame set by another software can be designated by the marker signals.

Figure 6:
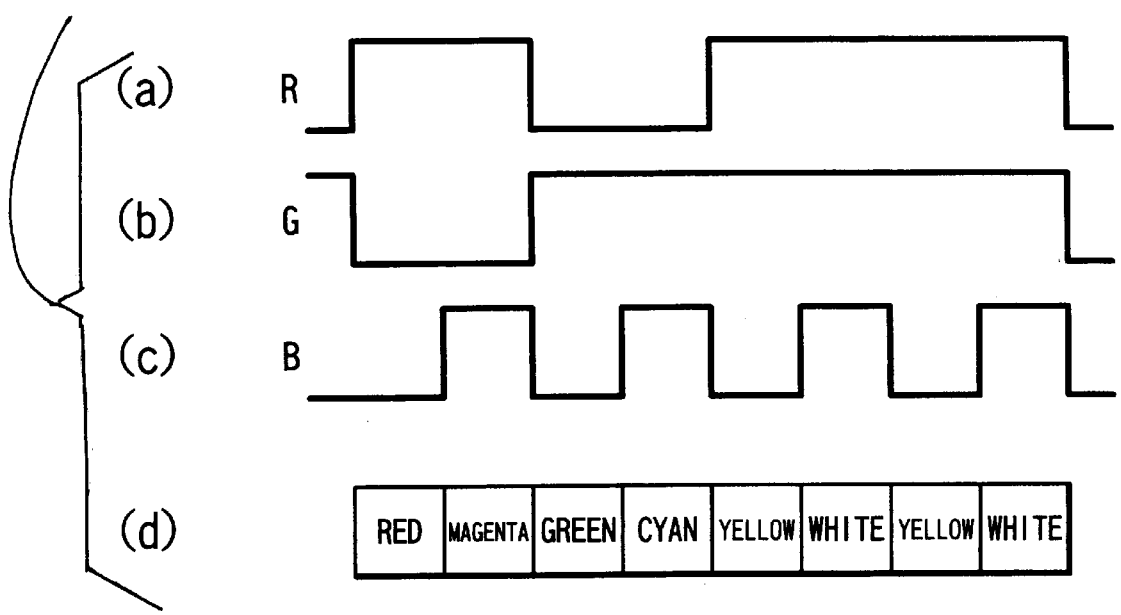
FIG. 6 is a diagram for explaining an example of marker signals according to the first embodiment of the present invention.

FIG. 6 shows an example of the marker signals 102a, 102b, 102c, 102d. In this case, the red signal R, the green signal G and the blue signal B are assumed to have the levels shown in (a), (b), (c), respectively, of FIG. 6, and as shown in (d) of FIG. 6, assumed to change the colors in the order of "red, magenta, green, cyan, yellow, white, yellow and white" in a predetermined section within one horizontal line. This color change is adapted to occur in cycles synchronized with the clock used for generating the video signal, for example. Apart from the example of marker signals shown here, the marker signals 102a, 102b, 102c, 102d at the four corners may be configured by marker signals in different patterns, respectively.

The video signal in which the marker signals are arranged as described above is supplied to the display unit 210. This video signal is received and processed in the display unit 210 so that the image based on the video signal is displayed. In the process, the receive processing circuit in the display unit 210 detects the marker signals inserted in the video signal and performs the predetermined image processing for the range indicated by the marker signals detected at the four corners.

Figure 7:
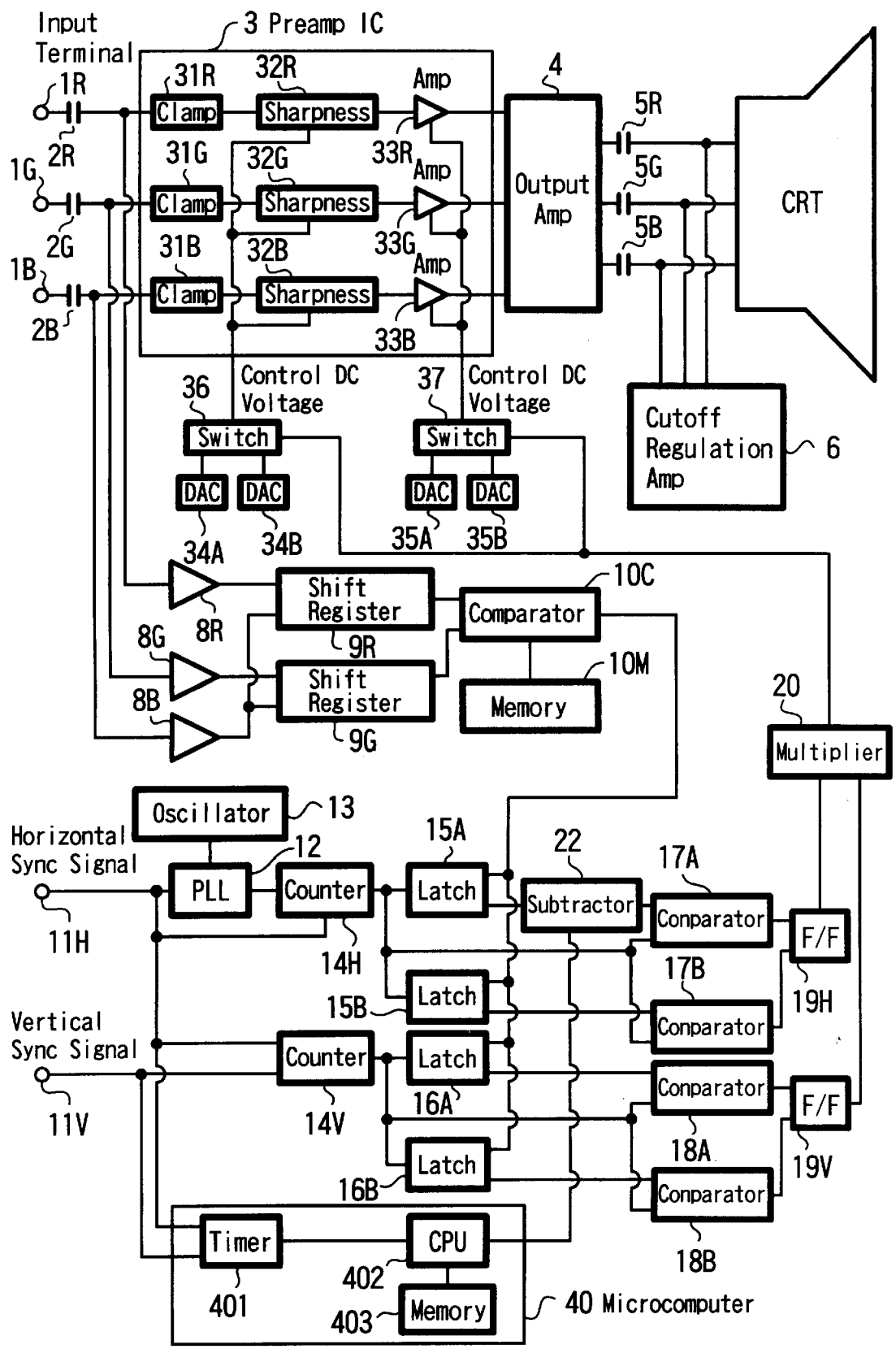
FIG. 7 is a block diagram showing an example of the display unit the display of which is controlled by the video signal generated according to the first embodiment of the present invention.

FIG. 7 is a diagram showing an example circuit configuration in the display unit 210 for detecting the marker signals and performing the receive processing. Input terminals 1R, 1G, 1B are supplied with the video signals (red signal R, green signal G, blue signal B) from the video output unit 209 of the computer proper 200. The video signals R, G, B supplied to the input terminals 1R, 1G, 1B are supplied to a preamplifier IC3 through capacitors 2R, 2G, 2B, respectively. In the preamplifier IC 3, the video signals (R/G/B) supplied thereto are supplied to sharpness improving circuits 32R, 32G, 32B described later through clamp circuits 31R, 31G, 31B, respectively, and further taken out through amplifiers 33R, 33G, 33B, respectively, described later.

The video signals (R/G/B) taken out from the preamplifier IC 3, after being further amplified in an output amplifier 4, are taken out through capacitors 5R, 5G, 5B. Further, the video signals (R/G/B) taken out in this way are subjected to DC voltage conversion in a cut-off regulation amplifier 6, and then supplied to a cathode ray tube (hereinafter referred to as a CRT), for example, constituting a display means. An image due to the video signals (R/G/B) improved in quality as described later is displayed on the CRT 7.

Also, in the display unit, a microcomputer (hereinafter sometimes referred to as a micro) 40 for controlling the various functions generates first and second DC voltage data for controlling the sharpness and first and second DC voltage data for controlling the contrast ratio. Further, these data generated are supplied to D/A conversion (hereinafter referred to as the DAC) circuits 34A, 34B, and 35A, 35B, respectively, and thus converted into control DC voltages.

The control DC voltages converted in these DAC circuits 34A, 34B and 35A, 35B are selected by switch circuits 36, 37 respectively and supplied to the preamplifier IC 3 described above. As a result, the preamplifier IC 3 controls the sharpness improvement circuits 32R, 32G, 32B and the amplifiers 33R, 33G, 33B described above, for example, in accordance with the control DC voltages supplied thereto thereby to improve the sharpness and the contrast, respectively.

Also, in this embodiment, in addition to the video signals (R/G/B), the horizontal and vertical synchronizing signals are supplied from the computer proper 200 to input terminals 11H, 11V, respectively. The horizontal sync signal is supplied from the input terminal 11H to a PLL circuit 12, to which PLL circuit 12 an oscillation signal is supplied from an oscillator 13, thereby forming an arbitrary clock signal synchronized with the horizontal synchronizing signal. This clock signal is supplied to the counting terminal of a horizontal counter 14H. Also, the horizontal synchronizing signal or a signal synchronized with the horizontal synchronizing signal is supplied to a reset terminal thereof. As a result, a count value corresponding to the horizontal position on the display screen is taken out from the horizontal counter 14H.

Also, the horizontal synchronizing signal is supplied to the counting terminal of a vertical counter 14V, and the vertical synchronizing signal from the input terminal 11V or a signal synchronized with the vertical synchronizing signal is supplied to the reset terminal thereof. As a result, a count value of corresponding to the vertical position on the display screen is taken out from the vertical counter 14V. The count values of on the horizontal counter 14H and the vertical counter 14V are supplied to latch circuits 15A, 15B and 16A, 16B, respectively.

Further, the video signals from the input terminals 1R, 1G are supplied to the input terminals of shift registers 9R, 9G through amplifiers 8R, 8G, respectively, on the one hand, and the video signal from the input terminal 1B is supplied to the clock terminals of the shift registers 9R, 9G through a comparator 8B The signals accumulated in the shift registers 9R, 9G are supplied to a comparator 10C and compared with the signal pattern stored in a memory 10M, for example The memory 10M has stored therein data of a pattern preset as a marker signal (the pattern indicating the level shown in FIG. 5, for example), and the marker signals are detected by the comparison in the comparator 10C.

The detection signal of the signal pattern thus detected in the comparator 10C is supplied to the trigger terminals of the latch circuits 15A, 16A and 15B, 16B. Consequently, the latch circuits 15A, 15B latch the count value corresponding to the horizontal position on the display screen having the marker signal pattern 102a or 102c. The latch circuit 15B also latches the count value corresponding to the horizontal position on the display screen having the marker signal pattern 102b or 102d, for example.

Further, the latch circuits 16A, 16B latch the count value corresponding to the vertical position on the display screen having the marker signal pattern 102a or 102b. Also, the latch circuit 16B latches the count value corresponding to the vertical position on the display screen having the marker signal pattern 102c or 102d, for example.

The signals latched in these latch circuits 15A, 15B and 16A, 16B are supplied to comparators 17A, 17B and 18A, 18B, respectively. At the same time, the count values of the horizontal counter 14H and the vertical counter 14V described above are supplied to the comparators 17A, 17B and 18A, 18B, respectively. The output of the latch circuit 15A is supplied to the comparator 17A through a subtractor 22 for shifting the timing forward in the horizontal direction by an amount corresponding to the length of the marker signals As a result, the comparator 17A outputs a signal when the count value of the horizontal counter 14H comes to coincide with the count value of the horizontal position of the marker signal pattern 102a or 102c latched by the latch circuit 15A. Also, the comparator 17B outputs a signal when the count value of the horizontal counter 14H comes to coincide with the count value of the horizontal position of the marker signal pattern 102b or 102d latched in the latch circuit 15B.

Further, the comparator 18A outputs a signal when the count value of the vertical counter 14V comes to coincide with the count value of the vertical position of the marker signal pattern 102a or 102b latched in the latch circuit 16A. Also, the comparator 18B outputs a signal when the count value of the vertical counter 14V comes to coincide with the count value of the vertical position of the marker signal pattern 102c or 102d latched in the latch circuit 16B.

The signals from these comparators 17A and 17B are supplied to the set and reset terminals of a flip-flop 19H thereby to output a pulse signal corresponding to the width in horizontal direction of the image processing window frame 101. Also, the signals from the comparators 18A and 18B are supplied to the set and reset terminals of a flip-flop 19V thereby to output a pulse signal corresponding to the width in vertical direction of the image processing window frame 101.

Further, the signals from the flip-flops 19H and 19V are synthesized in a multiplier 20 thereby to form a control signal for the section in the image processing window frame 101. This control signal is supplied to switch circuits 36, 37, and the control DC voltages converted in the DAC circuit 34A or 34B and 35A 35B are selected. In this way, the ratios of the sharpness and the contrast of the image in an arbitrary area designated by the control signal from the multiplier 20 are changed in the image displayed on the CRT 7 described above.

By the way, the process of shifting the timing by an amount corresponding to the length of the marker signals by subtraction in the subtractor 22 is performed in such a manner that the horizontal and vertical synchronizing signals supplied to the input terminals 11H, 11V described above are supplied to a timer 401 built in the microcomputer 40 thereby to measure the horizontal and vertical synchronizing signal frequencies. The synchronizing signal frequencies thus measured are supplied to a CPU 402, so that the time length of the signal pattern configuring the marker signals is determined from the data stored in a memory 403 connected to the CPU 402, for example. The count value of the horizontal clock signal corresponding to the time length thus determined is calculated in the CPU 402, and the value thus calculated is supplied to the subtractor 22 from the microcomputer 40. In this way, the positions of the marker signals stored in the latch circuit 15A can be shifted by an amount of the time length determined forward in the horizontal direction.

The display unit configured as described above is supplied with the video signal from the computer proper 200 according to this embodiment to perform the receive processing. In this way, the window frame 101 is arranged in the range where images of photos and moving images or the like applied to the display screen are displayed, for example, so that the sharpness (contour correction) and the contrast (brightness correction) only within the window frame 101 can be set to a higher correction mode than in the other portions. As a result, the quality of the portions where the images of the input photos and moving images or the like are displayed, i.e. the image quality in the window frame 101 can be improved. The image processing for improving the image quality can be also performed by other image processing such as gamma correction, color correction or the like. These image processings are not performed in the display area other than the interior of the window frame 101. Thus, the image processing can be set in a way suitable for displaying characters, numerals, etc. as a computer display unit.

As described above, in this apparatus, an arbitrary image processing is executed only in a designated area. In the case where the input images such as photos and moving images or the like are displayed together with the information such as characters, numerals or the like, therefore, the information of characters and numerals or the like is not hard to see and the quality of the image input can be improved.

By generating the video signal with the marker signals inserted in the computer proper 200 according to this embodiment and supplying the video signal to the display unit 210 in this way, the display unit 210 can perform the control operation automatically in such a manner that the image processing suitable for the image is performed only for the image within the image processing window frame 101 but not in the range other than the window frame 101. Thus, the image processing can be controlled easily for an arbitrary position in a single screen. In this case, only the video signal is required to be supplied to the display unit 210 from the computer proper 200, and a control signal for controlling the image processing range other than the video signal need not be supplied. The control process according to this embodiment, therefore, does not complicate the connection between the computer proper 200 and the display unit 210.

Figure 8:
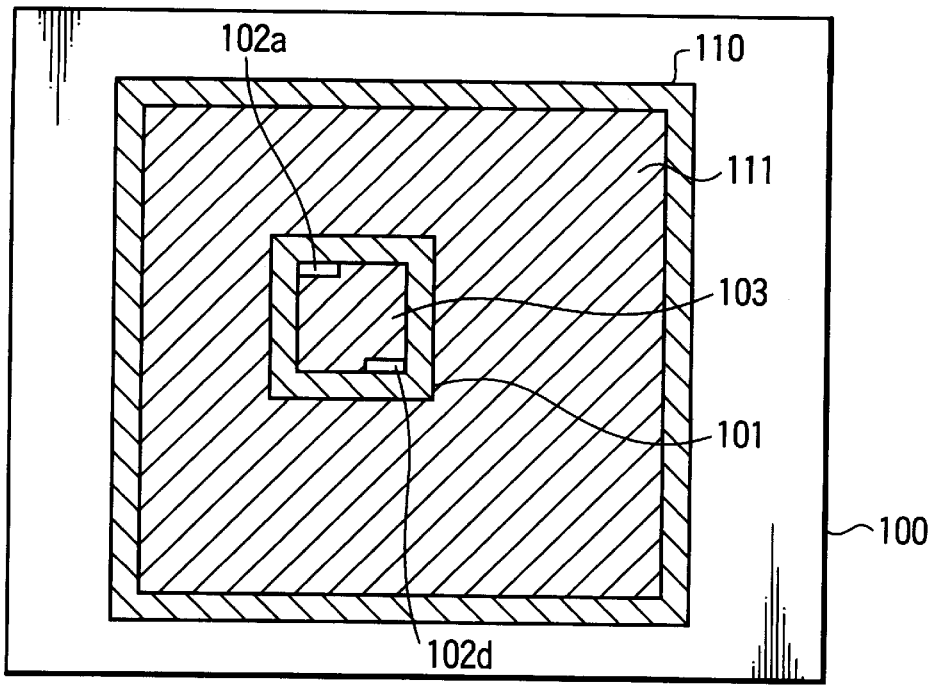
FIG. 8 is a diagram for explaining an example of another display condition according to the first embodiment of the present invention.

Also, according to this embodiment, the position of the image processing window frame 101 can be set at an arbitrary position by an input based on the user operation by way of the mouse 205 or the keyboard 204. The image at a given position in the screen displayed, therefore, can be processed in a manner suitable for the particular image. This image processing control can be performed for an image, wherever it is displayed. As shown in FIG. 5, for example, an arbitrary range in the window frame 110 displayed by other software is designated by the window frame 101 according to the present embodiment. Then, regardless of what software is used for displaying the image, it can be processed by incorporating the software according to the embodiment in the computer proper 200. Thus multipurpose application characteristic is improved In the examples shown in FIGS. 4 and 5, the marker signals are arranged at the four corners of the image processing window frame 101. As an alternative, the range designation is possible by arranging the marker signals at least in two corners of the image processing window frame. Specifically, as shown in FIG. 8, for example, the predetermined window frame 110 is arranged in the display screen 100, and the image processing window frame 101 is set at an arbitrary position in the range 111 which is to display images or the like within the window frame 110. The marker signals 102a and 102d are arranged only at the internal two corners of the image processing window frame 101, so that a predetermined image processing is performed only for the partial range 103 within the range 111. By doing so, the processing similar to the case described above can be accomplished with two marker signals.

Explanation was made above with reference to the case shown in FIG. 4, in which one image processing window frame is set in one screen. Instead, a plurality of image processing window frames may be set in one screen, the positions of the respective window frames are specified by the marker signals, and the execution of the predetermined image processing may be designated for the respective areas thus specified.

Also, the example explained above refers to the case in which a predetermined image processing is executed for an area within the image processing window frame. Even in the case where such a window frame is not set, however, a predetermined range in one screen may be designated by marker signals so that a predetermined image processing may be performed for the particular range. Specifically, without providing the physical image processing window frame 101 displayed in the screen, only the marker signals may be arranged at the four (or two) corners of a predetermined rectangular range so that the image processing is performed in the particular range which is different from the image processing for other portions.

Now, a second embodiment of the present invention will be explained with reference to FIGS. 9 to 16. Also, this embodiment is applied to the display control processing of a display unit constituting display means of the computer equipment making up information processing equipment called the personal computer apparatus. The system configuration of this embodiment is similar to the one shown in FIG. 2 of the first embodiment. The configuration of the computer proper 200 is also the same as the one shown in FIG. 1 in the first embodiment described above. According to this embodiment, however, in the case where marker signals are inserted under the control of the control unit 201 of the computer proper 200, the range of insertion thereof can be changed by the user.

Figure 9:
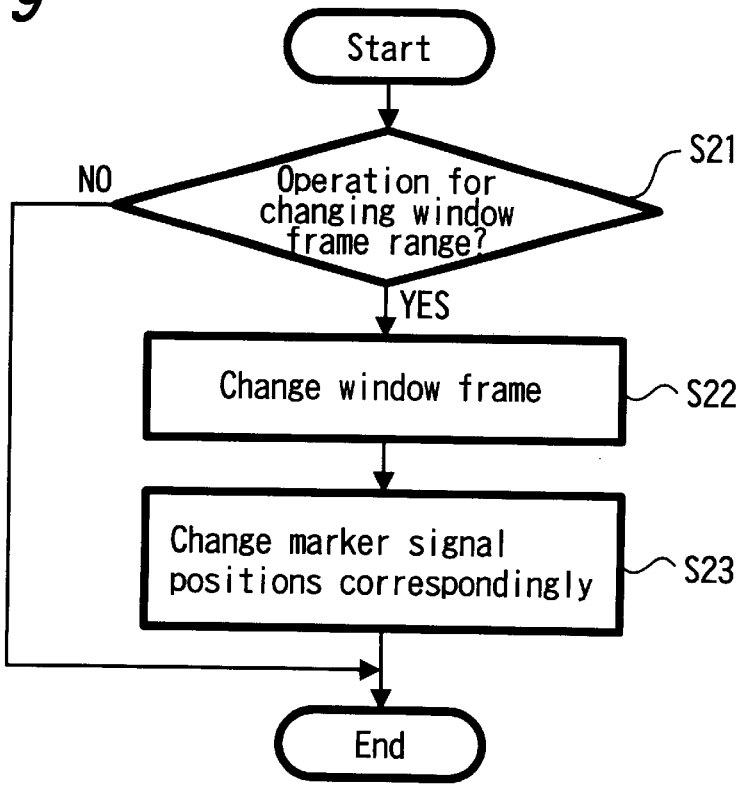
FIG. 9 is a flowchart showing an example of display control processing according to a second embodiment of the present invention.

Specifically, FIG. 9 shows the process for changing the range of the image processing window frame with the marker signals arranged therein for the computer proper 200 according to this embodiment. The explanation of this will follow. First, the control unit 201 judges whether or not the operation has been performed for setting the mode of changing the window frame by the user operation through the mouse 205 or the keyboard 204 (step S21). If the judgment is that the operation is not performed for setting the mode of changing the window frame, the process for changing the window frame is not executed. In the case where the judgment is that the operation has been performed for setting the mode of changing the window frame, on the other hand, the process for changing the range of the window frame is executed into the state corresponding to the operation of the mouse, etc. involved (step S22). Once the range of the window frame has been changed, the process for changing the arranging positions of the marker signals is also executed so as to set the marker signal positions at the internal four (or two) corners of the window frame as a process corresponding to the change of the window frame range (step 223).

Figure 10:
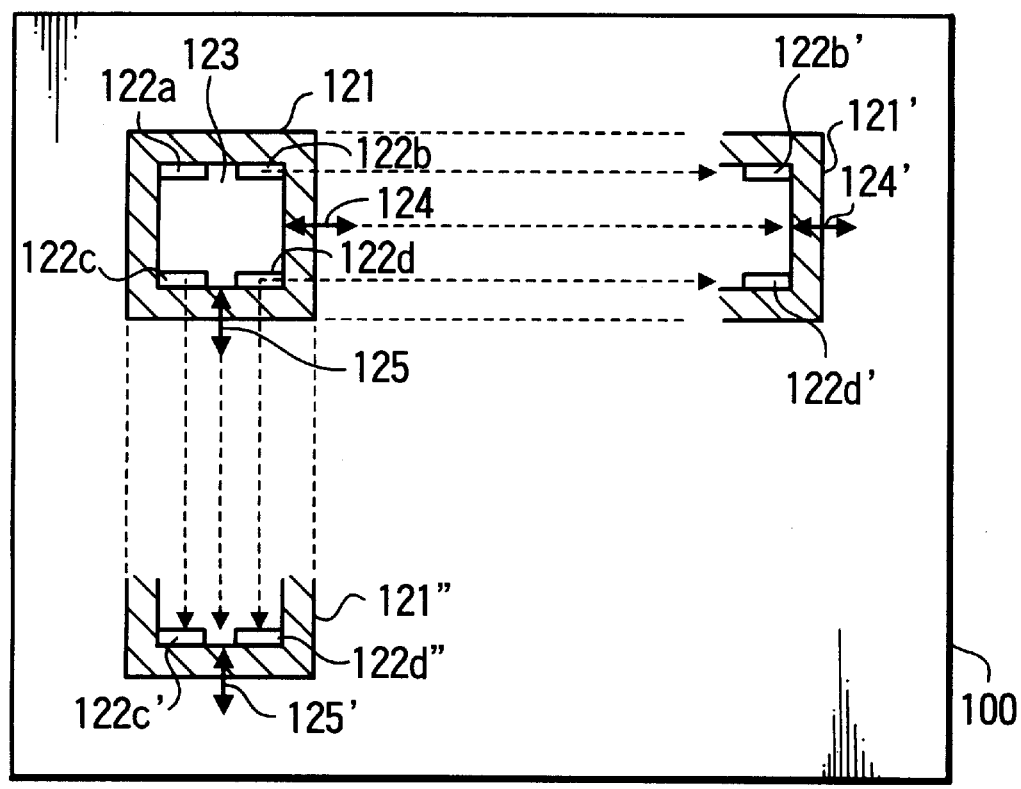
FIG. 10 is a diagram for explaining an example of a display condition according to the second embodiment of the present invention.

FIG. 10 is a diagram showing an example of the process for changing the window frame range in steps S22, S23, as viewed from the display on the screen. In this example, an image processing window frame 121 of a predetermined range is displayed on the screen 100, and marker signals 122a to 122d are arranged at the internal four corners of the window frame 121, and a range 123 within the window frame 121 is designated as the range of image quality change Under this condition, assume that the user has performed the operation of setting the mode of changing the range of the window frame by the operation of the mouse 205 or the keyboard 204. In the process, as the result of processing of the image processing unit 208 (or the video output unit 209) under the control of the control unit 201 of the computer proper 200, a lateral (horizontal) direction window frame designation pointer 124 and a longitudinal (vertical) direction window frame designation pointer 125 are displayed overlapped with the position of the current frame 121.

Under this condition, the cursor display is made to coincide with the position overlapped with the lateral direction window frame designation pointer 124 by the operation of the mouse 205, etc., and under this coincident state, a predetermined operation (click operation of the mouse, for example) is performed. Thus, the movement of the lateral direction window frame designation pointer 124 is selected, and the cursor position is moved in the lateral direction by mouse operation or the like. Then, the position of the pointer 124 changes correspondingly. It changes to the position of a pointer 124' shown in FIG. 10, for example.

With the position of the pointer 124 changed in this way, another predetermined operation (clicking the mouse, for example) is performed. Then, the position of the window frame 121 is changed to the position of the pointer 124 thereby to establish the lateral width of the window frame. For example, the window frame 121 shown in FIG. 10 is enlarged to a frame 121' corresponding to the position of the pointer 124'.

In the process, in response to the change of the range due to the enlargement (or reduction) of the window frame 121, the control operation is performed to change the positions of the marker positions arranged at the corners in an interlocking fashion therewith. In the case of FIG. 10, for example, when the frame 121' corresponding to the position of the pointer 124' is set, the marker signals 122b, 122d of the original positions are changed to marker signals 122b', 122d', for the upper and lower corner positions of the enlarged frame 121'.

Also, the cursor display by the operation of the mouse 205 or the like is set in coincidence with the position overlapped with the vertical direction window frame designation pointer 125, for example, and under this coincident state, a predetermined operation (clicking the mouse or the like) is performed. In this way, the movement of the window frame designation pointer 125 in lateral direction is selected correspondingly. When the cursor position is moved vertically by the mouse operation or the like, the position of a pointer 125 is changed correspondingly. It changes to the position of a pointer 125' shown in FIG. 10, for example.

With the position of the pointer 125 changed in this way, a predetermined operation (clicking the mouse, for example) is performed once again. Thus, the position of the window frame 121 is changed to the position of the pointer 125 thereby to establish the vertical width of the window frame. For example, the window frame 121 shown in FIG. 10 is enlarged to a frame 121" corresponding to the position of a pointer 125'.

Also in this case, the control operation is performed for changing the positions of the marker signals arranged at the corners in an interlocked operation therewith in response to the change of the range by the enlargement (or reduction) of the window frame 121. In the case of FIG. 10, for example, when the frame 121" corresponding to the position of the pointer 125' is set, the marker signals 122c, 122d of the original positions are changed to marker signals 122c', 122" of the upper and lower corner positions of the enlarged frame 121".

In this way, the lateral width and the vertical width of the window frame 121 can be changed independently. By setting an image processing window frame of an arbitrary size by the user operation, therefore, a predetermined image processing can be designated for an arbitrary range and position in the screen by the marker signals arranged in the window frame.

In the example of FIG. 10, the lateral width and the vertical width of the window frame are set independently. As an alternative, the certain aspect ratio of the window frame is determined in advance (for example, 1:1, 3:4, 9:16, etc.), and when the range is changed by one window frame designation pointer, the lateral width and the vertical width of the window frame may be changed in an interlocked fashion with each other.

Figure 11:
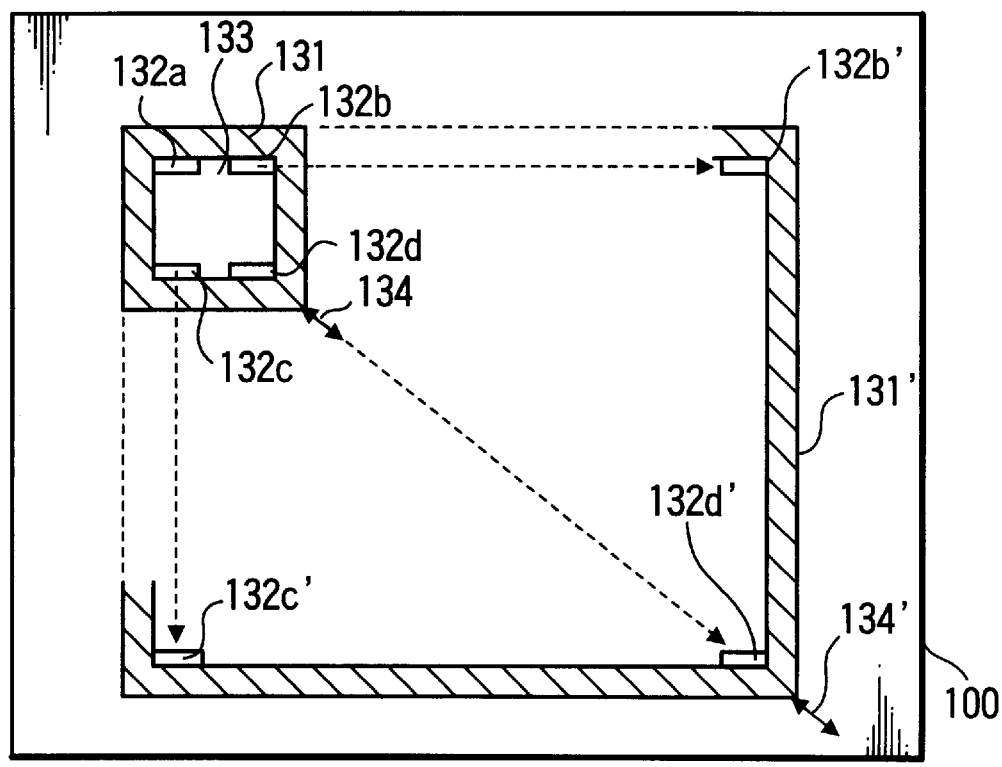
FIG. 11 is a diagram for explaining another example of another display condition according to the second embodiment of the present invention.

FIG. 11 is a diagram showing an example of display for the case mentioned above. In this case, an image processing window frame 131 of a predetermined range is displayed on the screen 100, and marker signals 132a to 132d are arranged at the internal four corners of the window frame 131. With an internal image processing range 133 of the window frame 131 designated as an image quality change range, assume that the user sets the mode for changing the range of the window frame by the operation of the mouse 205 or the keyboard 204. Then, by the processing operation in the image processing unit 208 (or the video output unit 209) under the control of the control unit 201 of the computer proper 200, a window frame designation pointer 134 is displayed while being overlapped with the current position of the frame 131 (the position at the lower right corner, for example).

Under this condition, for example, the cursor display by the operation of the mouse 205 or the like is set in coincidence with the position overlapped with the window frame designation pointer 134, and under this coincident state, a predetermined operation (clicking the mouse, for example) is performed. Thus, when the movement of the window frame designation pointer 134 is selected and the cursor position is moved diagonally by the mouse operation or the like, the position of the pointer 134 is changed correspondingly. It is changed to the position of a pointer 134' shown in FIG. 11, for example.

With the position of the pointer 134 being changed, a predetermined operation (clicking the mouse, for example) is performed again. Then, the position of the window frame 131 is changed to the position of the pointer 134, thereby establishing the lateral and vertical widths of the window frame. For example, the window frame 131 shown in FIG. 11 is enlarged to a frame 131' corresponding to the position of the pointer 134'.

At the same time, the control operation is performed to change the position of the marker signals arranged at the corners corresponding to the change of the range due to the enlargement (or reduction) of the window frame 131 in an interlocking fashion therewith. In the case of FIG. 11, for example, when the frame 131' corresponding to the position of the pointer 134' is set, the marker signals 132b, 132c, 132d at the original positions are changed to marker signals 132b', 132c', 132d ' at the positions of the respective corners of the enlarged frame 131'.

Figure 12:
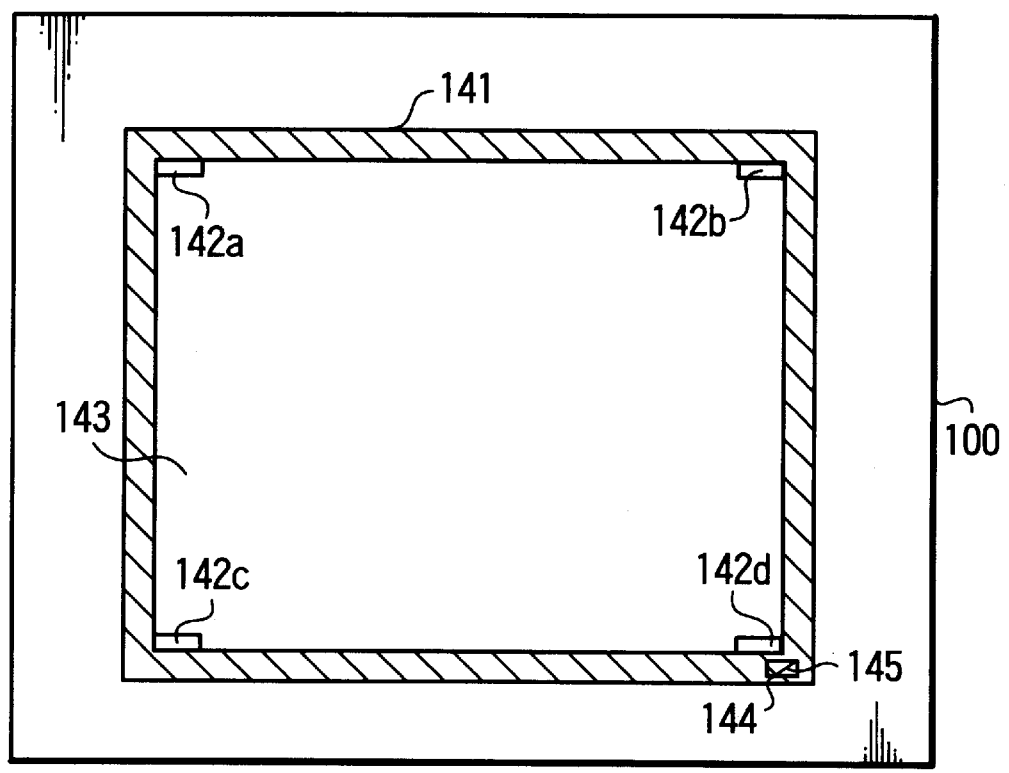
FIG. 12 is a diagram for explaining an example of display condition according to the second embodiment of the present invention.

The mode setting for performing the operation of changing the range of the image processing window frame described above or the like with reference to this embodiment may alternatively be set by designating by the cursor or the like some symbol, for example, displayed with the window frame in the screen. As shown in FIG. 12, for example, a symbol 144 for changing the window frame is displayed under the control of the control unit 201 at a predetermined position (at the lower right point in this case) of an image processing window frame 141 with the marker signals 142a to 142d arranged at the four internal four corners thereof. Then, by operating the mouse, for example, the position of a cursor 145 is set in coincidence with symbol 144 and a predetermined operation such as a mouse click is carried out to perform the change operation as shown in FIG. 10 or 11.

Figure 13:
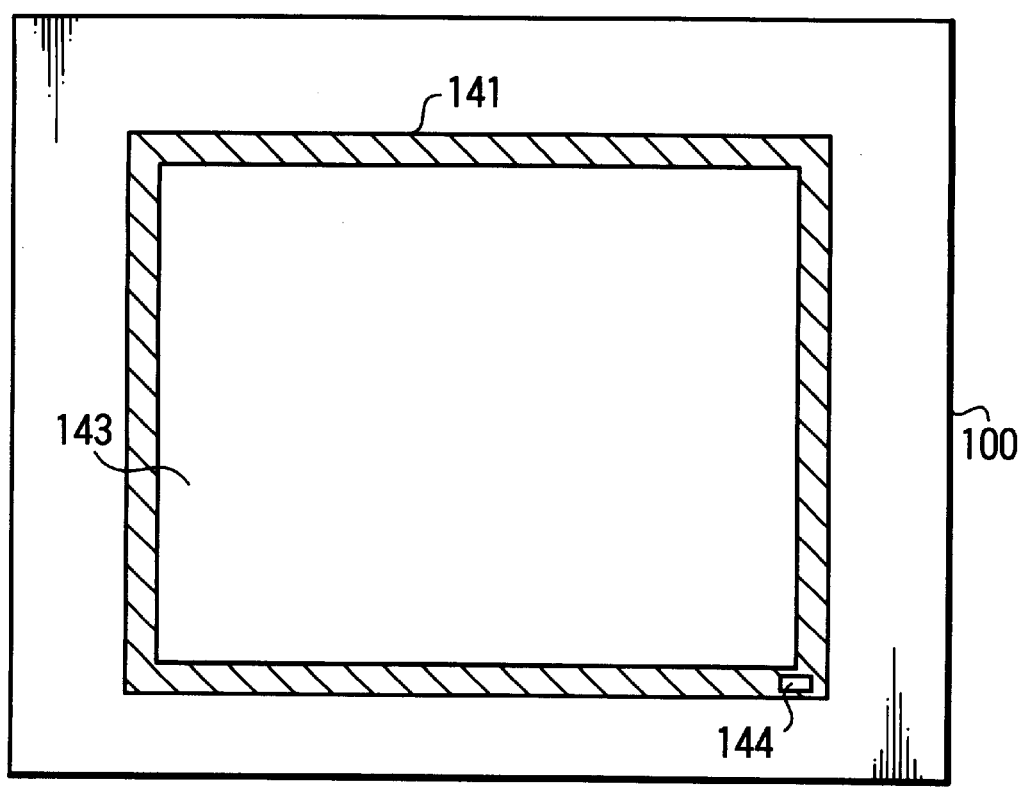
FIG. 13 is a diagram for explaining an example of display condition according to the second embodiment of the present invention.

As another alternative, the arrangement of the marker signals may be selected by the operation on the screen such as setting the cursor position to a symbol displayed in the image processing window frame or the like. As shown in FIG. 12, for example, the position of the cursor 145 is set to be coincident with the symbol 144 by the mouse operation or the like, and a predetermined operation such as click or the like is performed. In this way, the control operation may be performed not to arrange the marker signals in the image processing window frame 141 as shown in FIG. 13. By doing so, the execution of a predetermined image processing in the image processing range 143 in the window frame can be selectively controlled.

Figure 14:
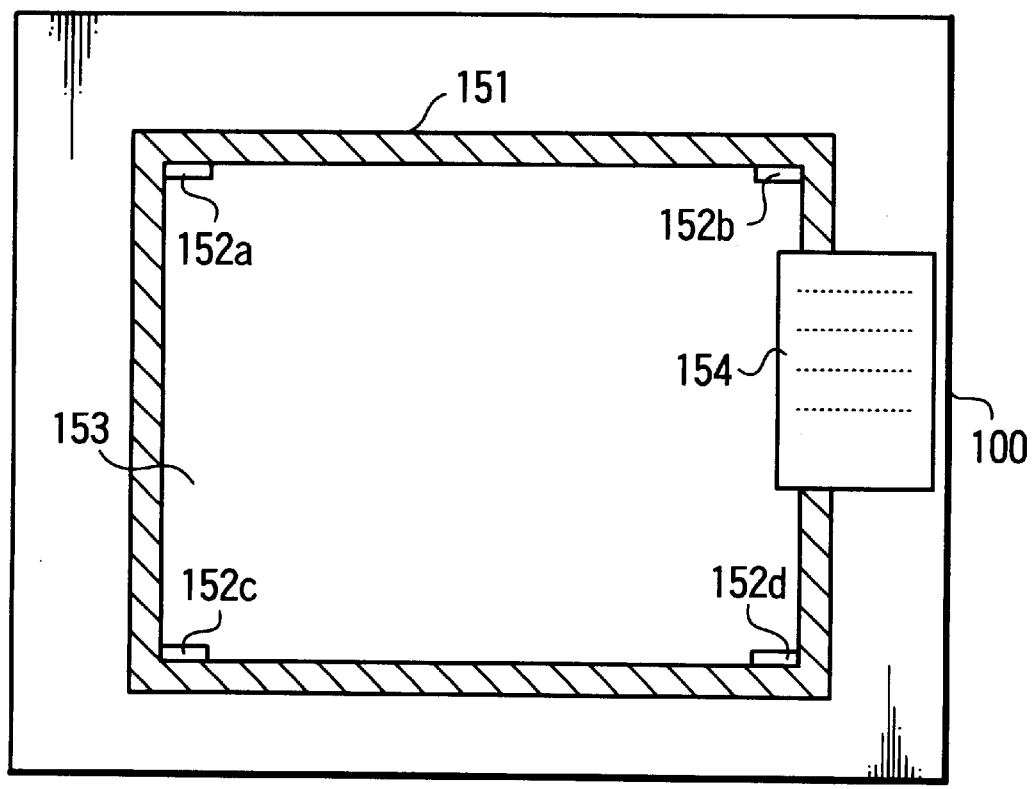
FIG. 14 is a diagram for explaining another example of display condition according to the second embodiment of the present invention.
Figure 15:
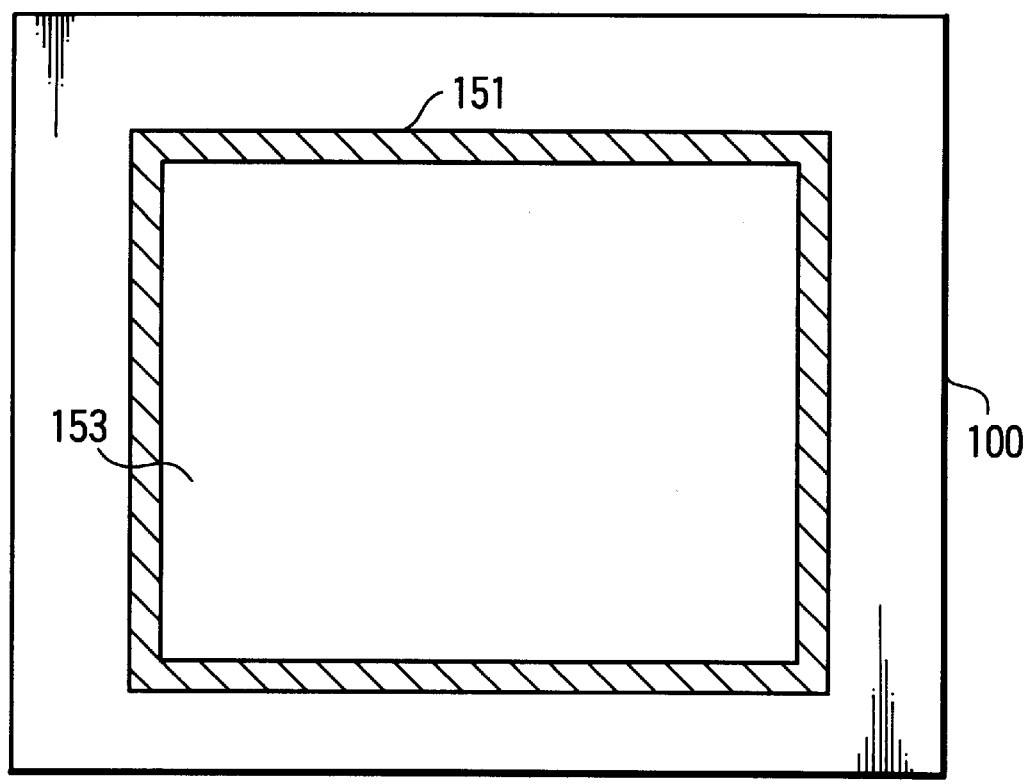
FIG. 15 is a diagram for explaining another example of display condition according to the second embodiment of the present invention.

Also, the mode setting for changing the range of the image processing window frame explained in this embodiment may be accomplished by selection from the menu screen. As shown in FIG. 14, for example, under the state that an image processing window frame 151 is displayed with marker signals 152a to 152d arranged at the internal four corners thereof, a menu screen 154 is displayed by a predetermined user operation (the operation of the mouse or the keyboard), and any of the items displayed in the menu screen 154 is selected by the operation of the mouse or the keyboard. In this way, the movement of the position of the window frame, the enlargement or reduction of the window frame range or the presence or absence of the arrangement of the marker signals is selected, and the item thus selected may be executed. The screen 100 shown in FIG. 15 represents the state in which the arrangement of the marker signals 152a to 152d in the image processing window frame 151 is eliminated by the selective operation described above, so that the predetermined image processing is not executed in the image processing range 143 in the window frame.

Figure 16:
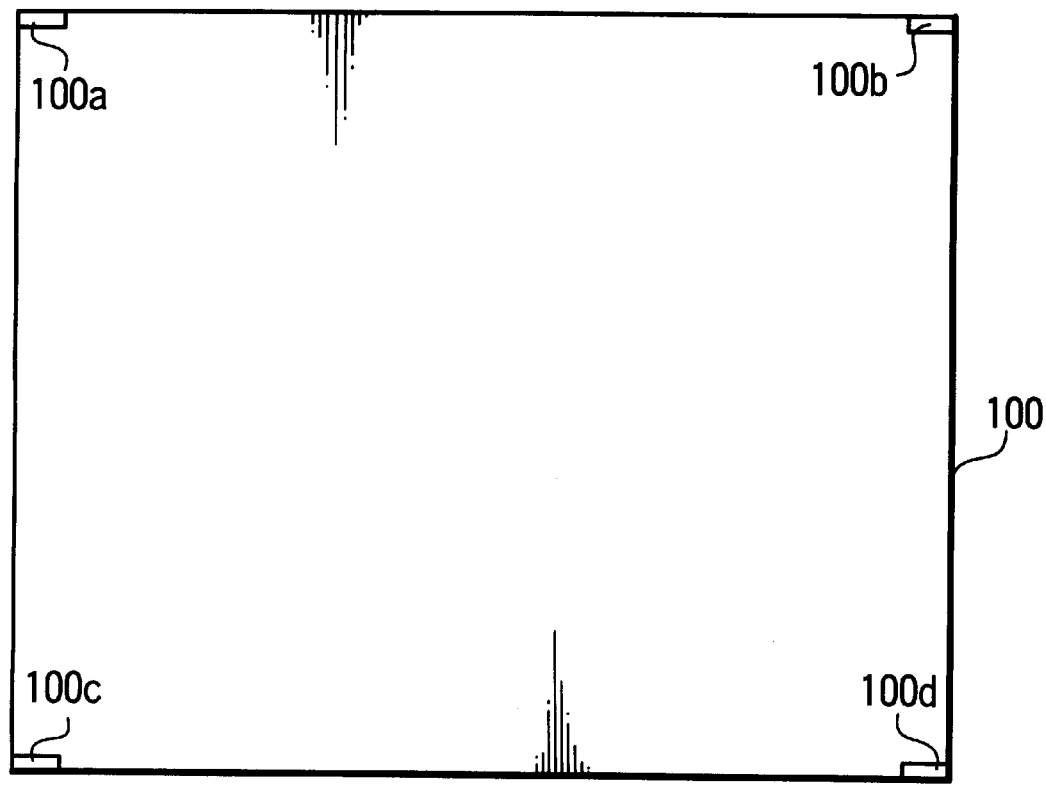
FIG. 16 is a diagram for explaining another example of display condition according to the second embodiment of the present invention.

The examples explained so far refer to the case in which the predetermined image processing control operation is performed in the image processing window arranged in a single screen. Alternatively, the marker signal may be arranged at four or two corners of a single screen so that the image processing condition is controlled over the whole screen. Specifically, by selection on the menu screen 154 shown in FIG. 14 or the like, for example, an item indicating the range covering the whole screen is selected. Then, a video signal is generated under the control of the control unit 201 by which as shown in FIG. 16, the image processing window frame is not displayed and the marker signals 100a to 100d are arranged at the four corners of the screen 100. By doing so, in the case where the image displayed over the whole screen by the video signal generated by the computer proper 200 is due to the image data such as static images or moving images, the control operation can be performed to display the particular image in superior fashion.

Each of the embodiments described above has a configuration in which only the marker signals indicating a range of the image processing window frame are arranged at the four or two corners of the particular image processing window frame. As an alternative, a control signal indicating the control state (regulation state of the image quality) of the image processing operation within the range designated by the particular marker signals may be arranged in the inside of the window frame or the like at the same time.

Figure 17:
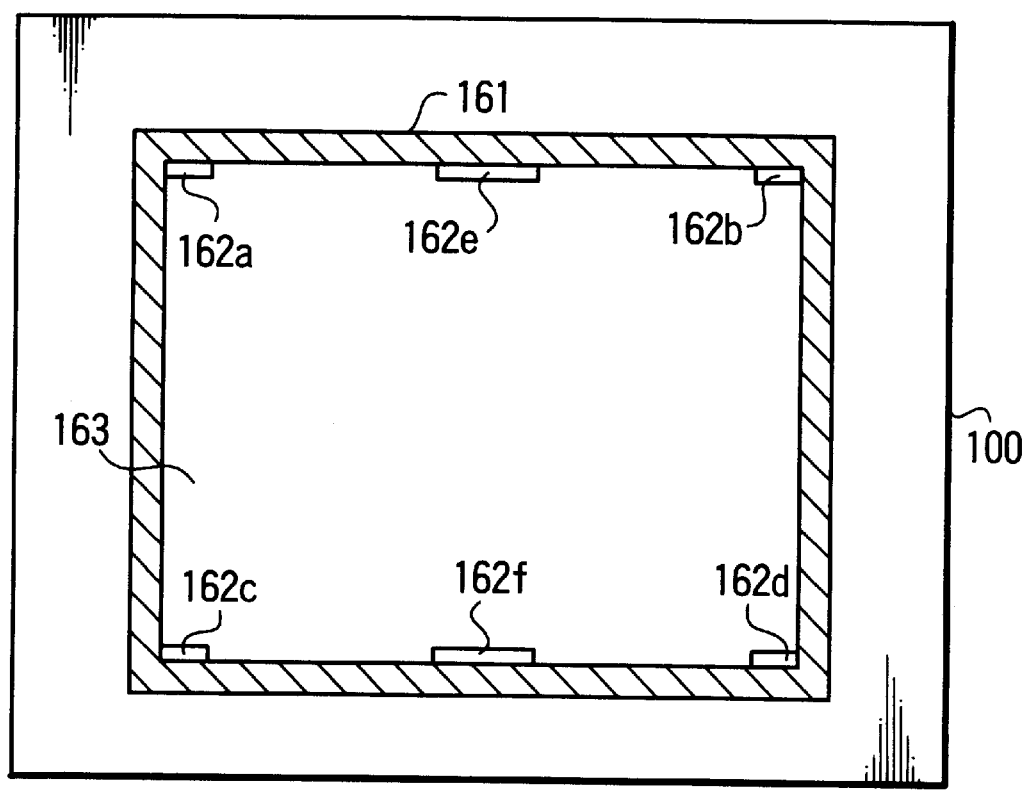
FIG. 17 is a diagram for explaining an example of display condition in the case where the processing according to each embodiment of the present invention is performed at the same time as the arrangement of a control signal.

Specifically, as shown in FIG. 17, for example, in the case where an image processing window frame 161 exists in the screen 100, marker signals 162a, 162b, 162c, 162d are arranged at the four corners of the image processing window frame 161, whereby a range 163 in the window frame is designated under the control of the control unit 201. At the same time, control signals 162e, 162f for controlling the image processing condition set for the process are inserted at predetermined positions inside the image processing window frame 161. In the process, it is necessary that the marker signals 162a to 162d are inserted at positions not overlapped with the positions where the control signals 162e, 162f are inserted. In the case of FIG. 17, the control signal 162e is arranged at the center on the horizontal line at the upper internal end of the image processing window frame 161, and the control signal 162f is arranged at the center on the horizontal line at the lower internal end of the image processing window frame 161. These control signals 162e, 162f are generated by combining the primary color signals of a predetermined level in a predetermined pattern (differently from the marker signals), for example, so that the control condition can be designated according to the particular pattern thereof. The specific control content designated by the control signals 162e and 162f includes the type of image processing controlled (such as the contour correction, brightness correction, gamma correction and color correction) and the data on the regulation level of the particular type of the processing.

Figure 18:
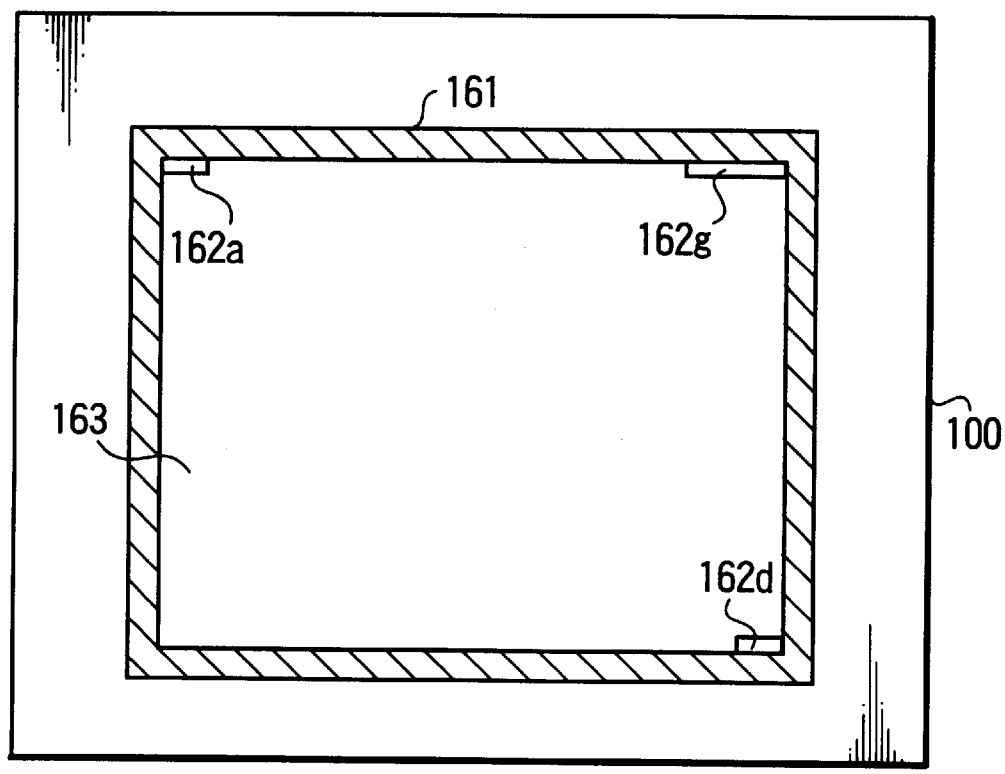
FIG. 18 is a diagram for explaining another example of display condition in the case where the processing according to each embodiment of the present invention is performed at the same time as the arrangement of a control signal.

FIG. 18 shows an example in which the control signal is arranged at the same time that the marker signals are arranged only at two corners in the window frame. Specifically, in this example, the marker signals 162a, 162d are arranged only at two corners in the image processing window frame 161 thereby to designate the range 163 in the window frame. At the same time, a control signal 162g for controlling the image processing condition set at that time is arranged at any one of the remaining two corners (at the upper right corner in the case under consideration) of the image processing window frame 161.

By doing so, if it is in the assumed that adjusting the sharpness for contour correction and adjusting the contrast for brightness correction as an image processing condition are executed by the marker signals and the control signals according to this embodiment, the control operation is performed in such a manner that the adjustment amount designated by the control signal is set within the range designated by the marker signals. By the way, in the case where the control signals are arranged in this manner, as described with reference to each embodiment, the control operation is performed to change the position of the control signal in an interlocked fashion with the change of the positions of the marker signals.

Figure 19:
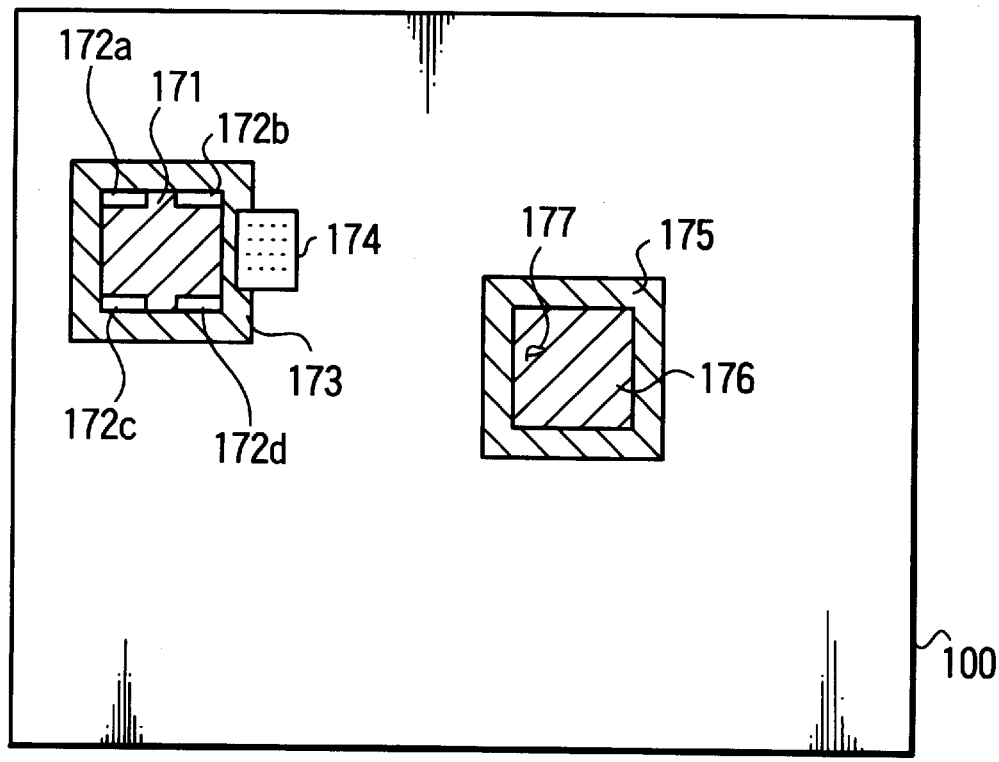
FIG. 19 is a diagram for explaining an example of the state (the state before overlap) in which the processing according to each embodiment of the present invention is performed with the display window overlapped.

Also, in the first embodiment described above, assume that the image processing window frame according to this embodiment is overlapped with another window frame described with reference to FIGS. 5 and 8. An arrangement may be made in such a manner that in the case where a predetermined operation is performed, the position of the image processing window frame moves automatically to an inside position or an outside position where it coincides substantially with another window frame on display. Specifically, as shown in FIG. 19, for example, assume that an image processing window frame 171 with the marker signals 172a to 172d arranged therein is displayed, and the execution of a predetermined image processing is designated in a range 173 of the window frame, while at the same time a window frame 175 lacking the marker signal arrangement is displayed with a predetermined image displayed in a range 176 in the same window frame. In the process, the mode is set for overlapping the image processing window frame 171 with the window frame 175 by operating the mouse or the keyboard. Then, the operation is performed for designating the range 176 according to a designation 177 by operating the mouse or the like.

Figure 20:
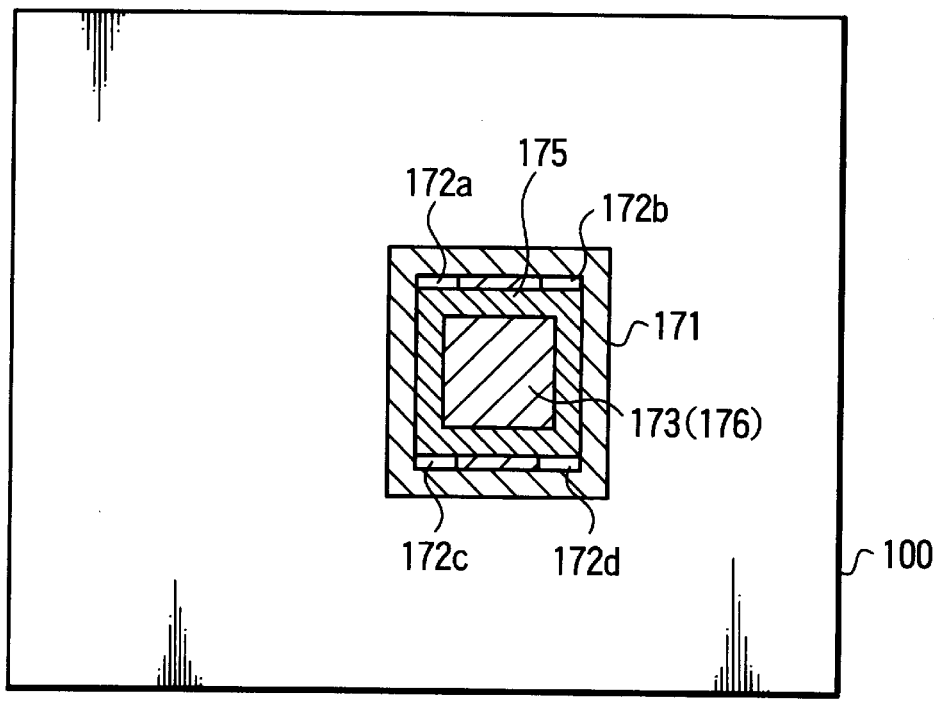
FIG. 20 is a diagram for explaining an example of the state (the state after overlap) in which the processing according to each embodiment of the present invention is performed with the display window overlapped.

With this operation, as shown in FIG. 20, the image processing window frame 171 with the marker signals 172a to 172d arranged outside of the window frame 175 is moved, and the whole range 176 in the window frame 175 is covered as designated by the marker signals. Thus, the control operation can be performed to conduct the predetermined image processing within this range. By the way, in the case where the image processing window frame 171 is moved outside of another window frame 175 automatically in this way, an arrangement may be made to automatically change the size of the image processing window frame 171 in accordance with the size of the window frame 175.

Figure 21:
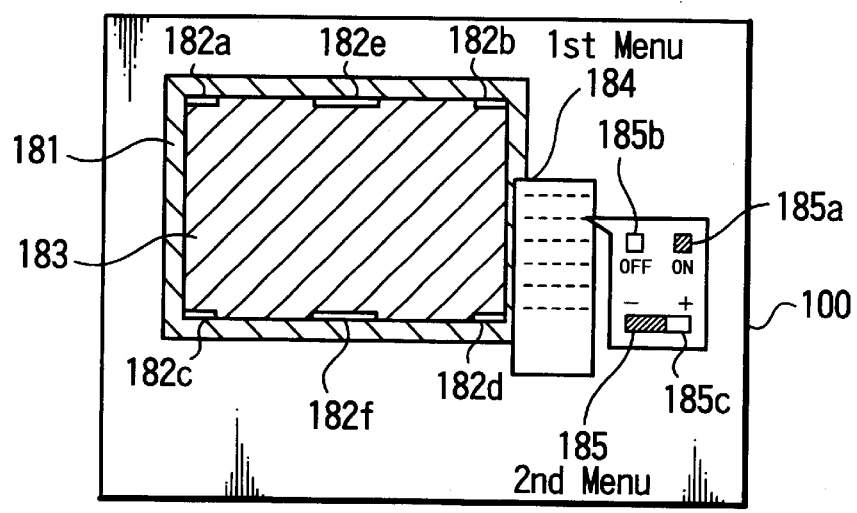
FIG. 21 is a diagram for explaining an example in which the processing according to each embodiment of the present invention can be adjusted for each item by the menu screen.

Also, as shown in FIGS. 17 and 18, in the case where the control signal is arranged with the marker signals, the control condition indicated by the control signal may be set by the user operation using the menu screen or the like. Specifically, as shown in FIG. 21, for example, assume that an image processing window frame 181 is set in the screen 100, and marker signals 182*a*, 182*b*, 182*c*, 182*d* at the four corners of the window frame 181 are inserted while at the same time inserting control signals 182*e*, 182*f* for controlling the image processing condition in the range 183 in the window frame. In this case, a first menu 184 is displayed in the screen 100, and adjustment items are displayed by the first menu 184. The adjustment condition for the item selected from the first menu 184 is displayed in a second menu 185. For the second menu 185, an on-display 185*a* or an off-display 185*b* for the adjustment of the particular item is displayed, while at the same time displaying the set adjustment amount in a bar graph 185*c*. In the adjustment by displaying the first menu 184 and the second menu 185, the control signals 182*e*, 182*f* inserted in the window frame 181 displayed in the prevailing screen 100 are regarded as those corresponding to the adjustment condition thereof. As a result, the user making the adjusting operation can perform the adjusting work while judging the adjustment condition by watching the state of the image displayed in the range 183 in the window frame.

As described above, the adjustment condition of the image processing condition can be set arbitrarily by the user operation. Therefore, the desired image display condition can be set. Also, by selecting an adjustment item, an arbitrary item can be adjusted. In this way, various adjustments are made possible. In other words, the image processing including at least one or more of the contour correction, the brightness correction, the gamma correction and the color correction can be set in an arbitrary state.

Figure 22:
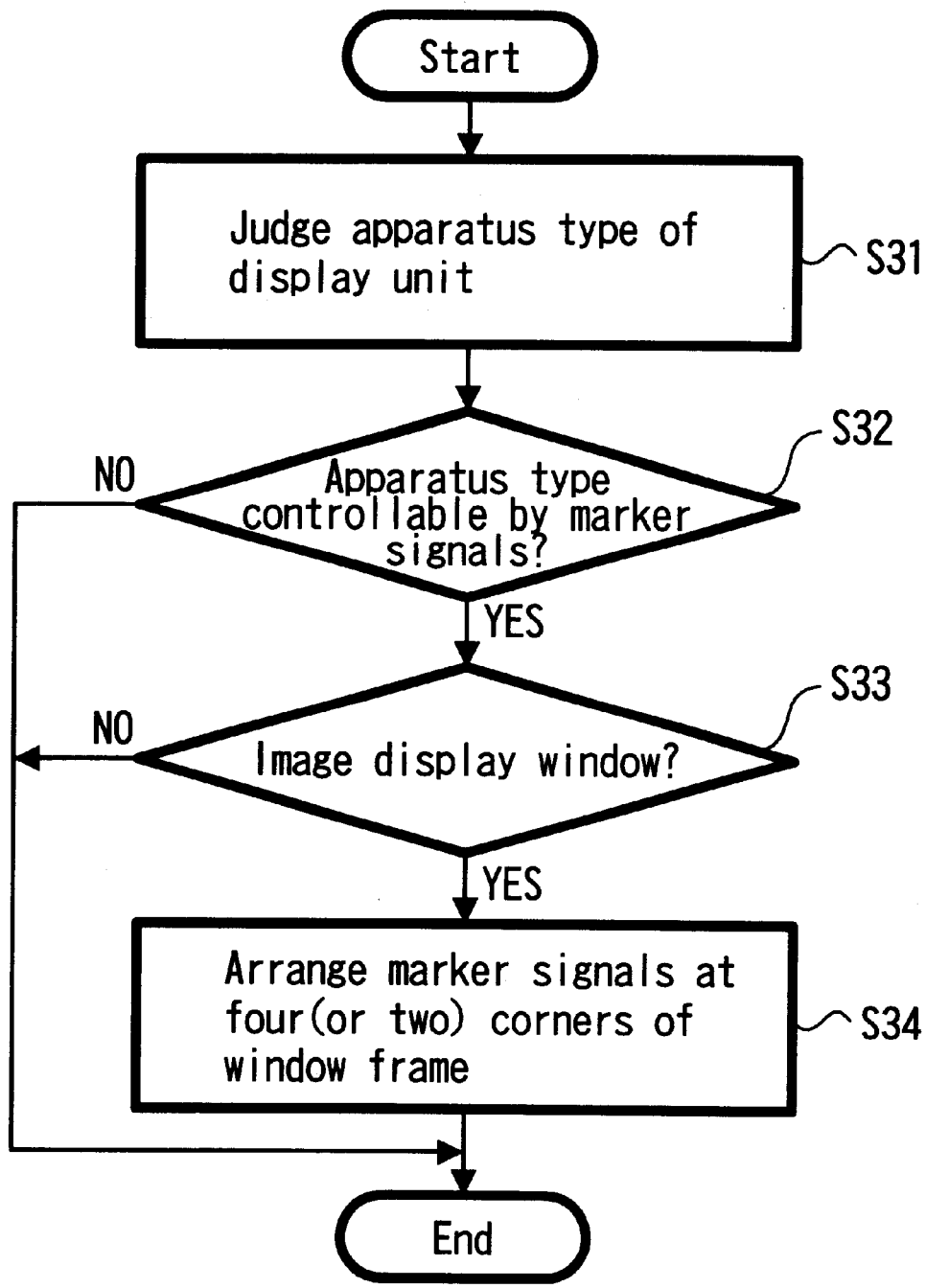
FIG. 22 is a flowchart showing an example of the control processing in the case where the processing according to each embodiment of the present invention is executed based on the judgment of the apparatus type.

Also, an arrangement can be made such that the process of inserting the marker signals and the control signal described above with reference to each embodiment can be performed only in the case where the control operation with the marker signals is possible as judged from the type of the display unit 210 connected with the computer proper 200. Specifically, as shown in the flowchart of FIG. 22, for example, the control unit 201 in the computer proper 200 judges the type of apparatus by obtaining the information on the model number of the display unit 210 connected thereto by communication with the display unit 210 (step S31). Then, it is judges whether or not the particular apparatus type is the one for which the image processing can be controlled by the marker signals (i.e. the type having the circuit as shown in FIG. 7) (step S32). In the case where it is judged that the apparatus type is such that the aforementioned control operation is impossible, the execution of the process for inserting the marker signals is not permitted. In the case where the apparatus type is judged as the one capable of such a control operation, on the other hand, the control unit 201 judges whether the output video signal has an image processing window frame or not (step S33). In the absence of an image processing window frame, the execution of the process for arranging the marker signals is prohibited, while in the presence of an image processing window frame, the process for arranging the marker signals at the four corners or the like of the window frame is executed by the video output unit 209 (step S34).

By performing the process in the manner described above, the undesirable case of the marker signals being inserted can be avoided when a display unit of the type incapable of the aforementioned control operation by the insertion of the marker signals is connected. Instead, the process of inserting the marker signals is performed positively only in the case where it is capable of the control operation. An example configuration of the type of the display unit will be explained. In the case of a type capable of control with the marker signals, for example, a special code is added to the tail of the model name to determine the presence or absence of the code. Assume, for example, that the original type name of a given display unit is "CPD-XXXGS". In the case where the function capable of control with the marker signals as in this embodiment is available, the code "ABC" indicating the fact is added to the tail thereof. Hence the model name "CPD-XXXGS ABC is defined". By doing so, the control unit 201 may only discriminate the tail code "ABC" in step S32 in the flowchart of FIG. 22.

In the absence of the communication function between the computer proper and the display unit, on the other hand, the user is rendered to input this model name, and it is judged from the input model name whether it is a type corresponding to the marker signals or not.

Also, an arrangement can be made in such a manner that not only the information as to whether or not the control operation is possible is judged by the marker signals but also controllable adjustment items are judged from the model name determined by the computer proper so that only the control signal for the particular controllable items judged so is inserted.

Further, each embodiment described so far refers to the process for the computer proper to control the display condition on the display unit connected to the computer proper. However, the processing according to each embodiment is of course applicable also to the case where the display is controlled on other display means. In the case where the image display and text display coexist on the television receiver, for example, the control operation can be performed in such a way that the range of text display is designated by the marker signals and the image processing suitable for text display is performed within that range.

According to the display control method described in claim 1, the video signal generated by this method is supplied to a display unit, whereby the image in the range designated by the marker signals can be processed in a different way from the images in other ranges on the display unit side. Thus, the display control of the image in a specific range is made possible, and the specific range in which the display is controlled can be moved by moving the position where the marker signals are inserted, based on a predetermined operating input. Thus, a specific range for display control can be easily set by the user operation using the mouse or the like.

According to the display control method described in claim 2, in the invention described in claim 1, the size of the range designated by the marker signals can be changed by the movement of the position where the marker positions are inserted, by a predetermined operating input. Thus not only the position setting but also the range setting can be easily accomplished.

According to the display control method described in claim 3, in the invention described in claim 1, the whole screen display can be set as the range by the movement of the position where the marker signals are inserted, and therefore the display control of the whole screen also becomes possible.

According to the display control method described in claim 4, in the invention described in claim 1, the marker signals can be generated easily by combining the primary color signals at a predetermined level in a predetermined pattern and inserted.

According to the display control method described in claim 5, in the invention described in claim 1, a predetermined control signal for designating the condition of the image processing executed in the range designated by the marker signals is inserted at a predetermined position on the horizontal line where the marker signals are inserted, and at the same time the position where the control signal is inserted is moved in an interlocked fashion with the movement of the position where the marker signals are inserted. Therefore, the condition of the display control by the marker signals is satisfactorily controlled by the control signal inserted in the position interlocked with the position where the marker signals are inserted.

According to the display control method described in claim 6, in the invention described in claim 1, the position where the marker signals are inserted is moved inside and outside of a predetermined window frame in the screen, so that the image displayed in a predetermined window frame having no marker signals can be easily designated by the marker signals.

According to the display control method described in claim 7, in the invention described in claim 1, the process for inserting the marker signals is executed only in the case where the display unit of the destination of the video signal is discriminated and the image processing based on the video signal is possible in the particular display unit. Thus, the inconvenience can be obviated in which the process is carried out for inserting the marker signals also in the case where a display unit incapable of being controlled by the marker signals is connected, for example.

According to the display control method described in claim 8, in the invention described in claim 7, a control signal for designating the image processing executable based on the marker signals in the display unit discriminated is inserted at a predetermined position other than the position where the marker signals are inserted in the same range, thereby controlling the image processing condition more finely according to the type of the display unit discriminated.

According to the display control apparatus described in claim 9, when a predetermined input is applied, the position where the marker signals are inserted is moved under the control of a control unit, and a video signal capable of display control of the images in an arbitrary range set by the input can be generated, so that an apparatus is provided in which a specific range for display control can be easily set by the user operation using the mouse or the like.

According to the display control apparatus described in claim 10, in the invention described in claim 9, the size of a predetermined range in the screen is changed by the movement of the position where the marker signals are inserted by the control unit, and therefore the display can be controlled easily in a range of an arbitrary size.

According to the display control apparatus described in claim 11, in the invention described in claim 9, the whole screen for display is designated as a range for display control by the movement of the position where the marker signals are inserted by the control unit, whereby the display control of the whole screen is also possible.

According to the display control apparatus described in claim 12, in the invention described in claim 9, the marker signal insertion processing unit performs the process for inserting the marker signals generated by combining the primary color signals of a predetermined level in a predetermined pattern, thereby making it possible to generate and insert the marker signals with a simple configuration.

According to the display control apparatus described in claim 13, in the invention described in claim 9, the maker signal insertion processing unit inserts a predetermined control signal designating the image processing condition for the range designated by the marker signals, in a predetermined position on the horizontal line with the marker signals inserted thereon, and the control unit moves the position where the control signal is inserted, in an interlocked fashion with the movement of the position where the marker signals are inserted, whereby the control condition for display control by the marker signals can be satisfactorily controlled with the control signal inserted in the position in an interlocked fashion with the positions where the marker signals are inserted.

According to the display control apparatus described in claim 14, in the invention described in claim 9, the positions where the marker signals are inserted under the control of the control unit are moved inside or outside of the window frame existing in the image associated with the video signal generated in the image processing unit, whereby the image displayed in a predetermined window frame having no marker signals can be easily designated by the marker signals.

According to the display control apparatus described in claim 15, in the invention described in claim 9, the control unit discriminates a display unit of the destination of the video signal, and only in the case where the discriminated display unit is capable of image processing based on the marker signals, the marker signals insertion processing unit performs the process for inserting the marker signals. In the case where a display unit incapable of control by the marker signals is connected, for example, therefore, the process for inserting the marker signals is not performed.

According to the display control apparatus described in claim 16, in the invention described in claim 15, a control signal designating the image processing executable based on the marker signals in the display unit discriminated by the control unit is inserted by the marker signal insertion processing unit at a predetermined position other than the position where the marker signals are inserted, whereby the image processing condition can be controlled more finely in accordance with the type of the display unit discriminated.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A display control method for controlling a predetermined image processing on a video signal and for displaying an image on a display unit, the method comprising the steps of:

inserting marker signals into a video signal at positions corresponding to two corners on a diagonal in a rectangular predetermined range of an image to be displayed, wherein said marker signals are used to define a location where said predetermined image processing is performed;

effecting different processings on video signals inside and outside of said rectangular predetermined range defined by said marker signals;

moving positions whereat said marker signals are inserted based on a predetermined operation input, thereby moving said rectangular predetermined range of said image to be displayed;

inserting a predetermined control signal indicating a condition of an image processing executed in said rectangular predetermined range designated by said marker signals in a predetermined position of a horizontal line in which said marker signals are inserted; and moving said predetermined position where said control signal is inserted in an interlocked fashion with said moving of said positions wherein said marker signals are inserted.

2. The display control method as described in claim 1, wherein a size of the rectangular predetermined range is changed by the step of moving the positions whereat the marker signals are inserted, based on the predetermined operation input.

3. A display control method as described in claim 2, wherein a whole image to be displayed is formed as the predetermined range by the step of moving the positions where the marker signals are inserted.

4. The display control method as described in claim 1, wherein the marker signals are generated by combining primary color signals of a predetermined level in a predetermined pattern.

5. The display control method as described in claim 1, wherein the positions where the marker signals are inserted are moved inside or outside of a predetermined window frame in the image.

6. The display control method as described in claim 1, wherein the step of inserting the predetermined marker signals includes discriminating a display unit constituting a destination of the video signal, and inserting the marker signals only when an image processing based on the marker signals can be executed in the display unit.

7. The display control method as described in claim 6, wherein a control signal designating the image processing executable based on the marker signals in the discriminated display unit is inserted in a predetermined position other than the position where the marker signals are inserted in the predetermined rectangular range.

8. A display control apparatus for controlling a predetermined image processing on a video signal and for displaying an image on a display unit, the apparatus comprising:

a video processing unit for generating a predetermined video signal;

a marker signal insertion processing unit for inserting marker signals in the predetermined video signal at positions corresponding to two corners on a diagonal in a predetermined range in one image, wherein the marker signals are used to define a location where the predetermined image processing is performed;

a processing unit for effecting different processings on video signals inside and outside of the predetermined range defined by the marker signals; and a control unit for moving, based on a predetermined input, the positions whereat the marker signals are inserted by the marker signal insertion processing unit, wherein the marker signal insertion processing unit inserts, at a predetermined position on a horizontal line wherein the marker signals are inserted, a predetermined control signal indicating a condition of an image processing executed in the predetermined range designated by the marker signals, and the control unit moves the predetermined position where the control signal is inserted in an interlocked fashion with the movement of the positions where the marker signals are inserted.

9. The display control apparatus as described in claim 8, wherein a size of the predetermined range is changed by movement of the positions whereat the marker signals are inserted by the control unit.

10. The display control apparatus as described in claim 8, wherein the whole image to be displayed forms the predetermined range by the movement by the control unit of the positions whereat the marker signals are inserted.

11. The display control apparatus as described in claim 8, wherein the marker signal insertion processing unit inserts marker signals generated by combining primary color signals at a predetermined level in a predetermined pattern.

12. The display control apparatus as described in claim 8, wherein the positions whereat the marker signals are inserted are moved under the control of the control unit inside or outside of a window frame existing in the image associated with the video signal generated by the image processing unit.

13. The display control apparatus as described in claim 8, wherein the control unit discriminates a display unit constituting a destination of the video signal to be displayed, and only when the discriminated display unit can execute the image processing based on the marker signals does the marker signal insertion processing unit perform the process for inserting the marker signals.

14. The display control apparatus as described in claim 13, wherein a control signal designating the image processing that can be executed based on the marker signals in the display unit discriminated by the control unit is inserted by the marker signal insertion processing unit at a predetermined position other than the positions whereat the marker signals in the predetermined range are inserted.

* * * * *